United States Patent [19]

Adamski et al.

[11] 4,029,223

[45] June 14, 1977

[54] BUS LOADER

[75] Inventors: Donald F. Adamski, Danville; David M. Anderson, Lafayette, both of Calif.

[73] Assignee: MB Associates, San Ramon, Calif.

[22] Filed: July 25, 1975

[21] Appl. No.: 599,063

[52] U.S. Cl. .............................. 214/77 R; 182/84; 182/96; 280/166

[51] Int. Cl.² ......................................... B60P 1/48

[58] Field of Search .............. 214/75 T, 77 R, 77 P; 280/166; 105/445, 447, 448; 182/84, 96; 296/62

[56] References Cited

UNITED STATES PATENTS

| | | | |
|---|---|---|---|
| 3,351,220 | 11/1967 | Kirkbride | 214/75 T |
| 3,572,754 | 3/1971 | Fowler | 280/166 |
| 3,651,767 | 3/1972 | Findeklee | 105/448 |
| 3,826,386 | 7/1974 | Tauer | 214/77 R |
| 3,893,697 | 7/1975 | Blitz et al. | 214/77 R X |
| 3,913,497 | 10/1975 | Maroshick | 105/447 |
| 3,913,759 | 10/1975 | Deacon | 214/77 R |

*Primary Examiner*—L. J. Paperner
*Attorney, Agent, or Firm*—Harness, Dickey & Pierce

[57] ABSTRACT

A bus loader for a wheel chair and for the infirm embodies a platform which is mounted within the entrance area at the front of the bus. A minimum change in the standard bus is achieved by removing the bottom and intermediate steps at the front entrance and mounting the loading mechanism within the resulting recess. The loading mechanism is so constructed that the doors will swing in at each side of the opening in a manner in which they are normally operated. The platform is moved to the ground or curbstone, the wheel chair is moved thereon and retained in position and the platform, wheel chair and occupant is raised and the platform advanced toward the bus driver and lowered upon the floor permitting the wheel chair occupant to drop a fare in the fare box. A rail is provided on the forward and inner sides of the platform so that the physically handicapped and the infirm may stand upon the platform and be raised into the bus thereby reducing the time required for loading the bus.

10 Claims, 7 Drawing Figures

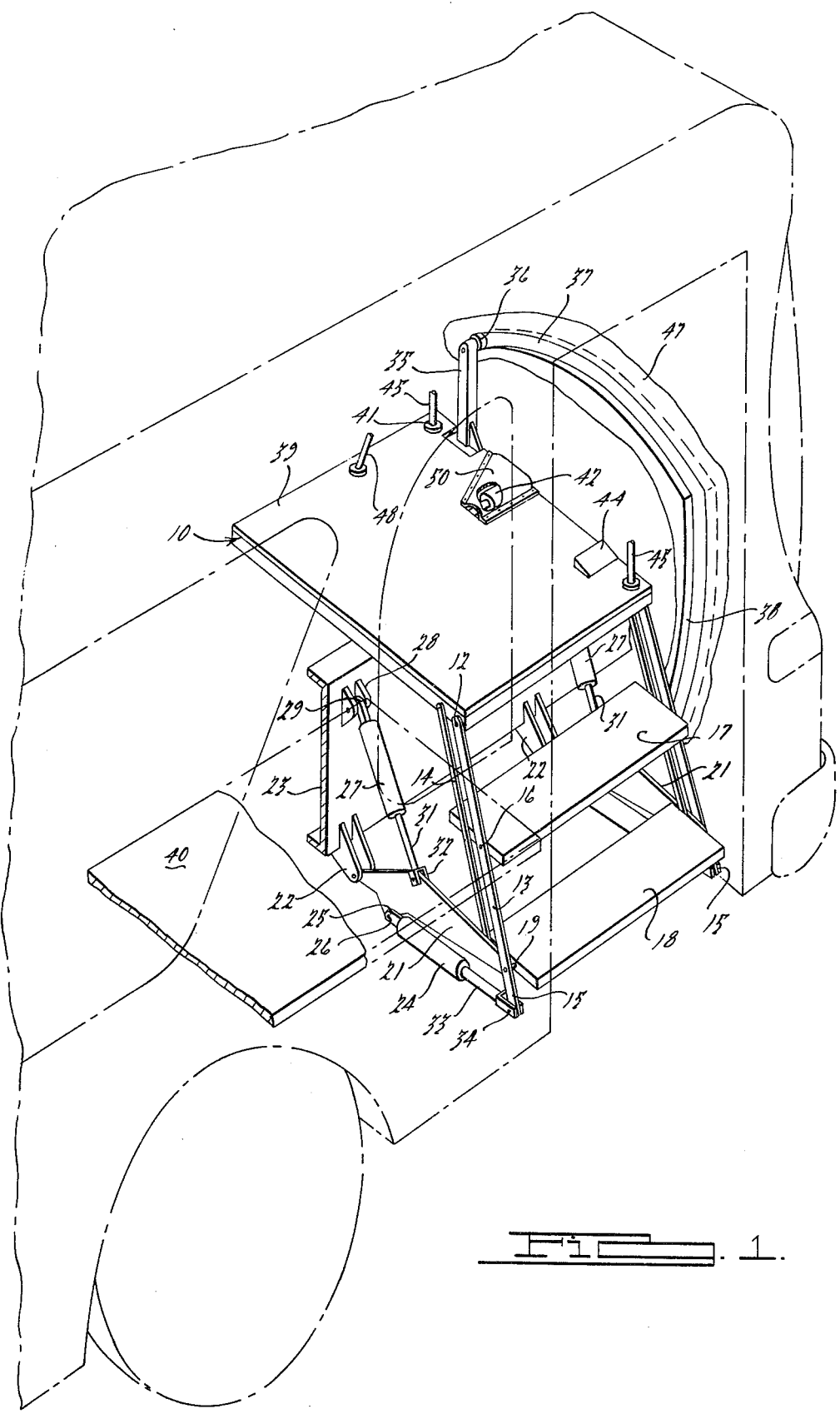

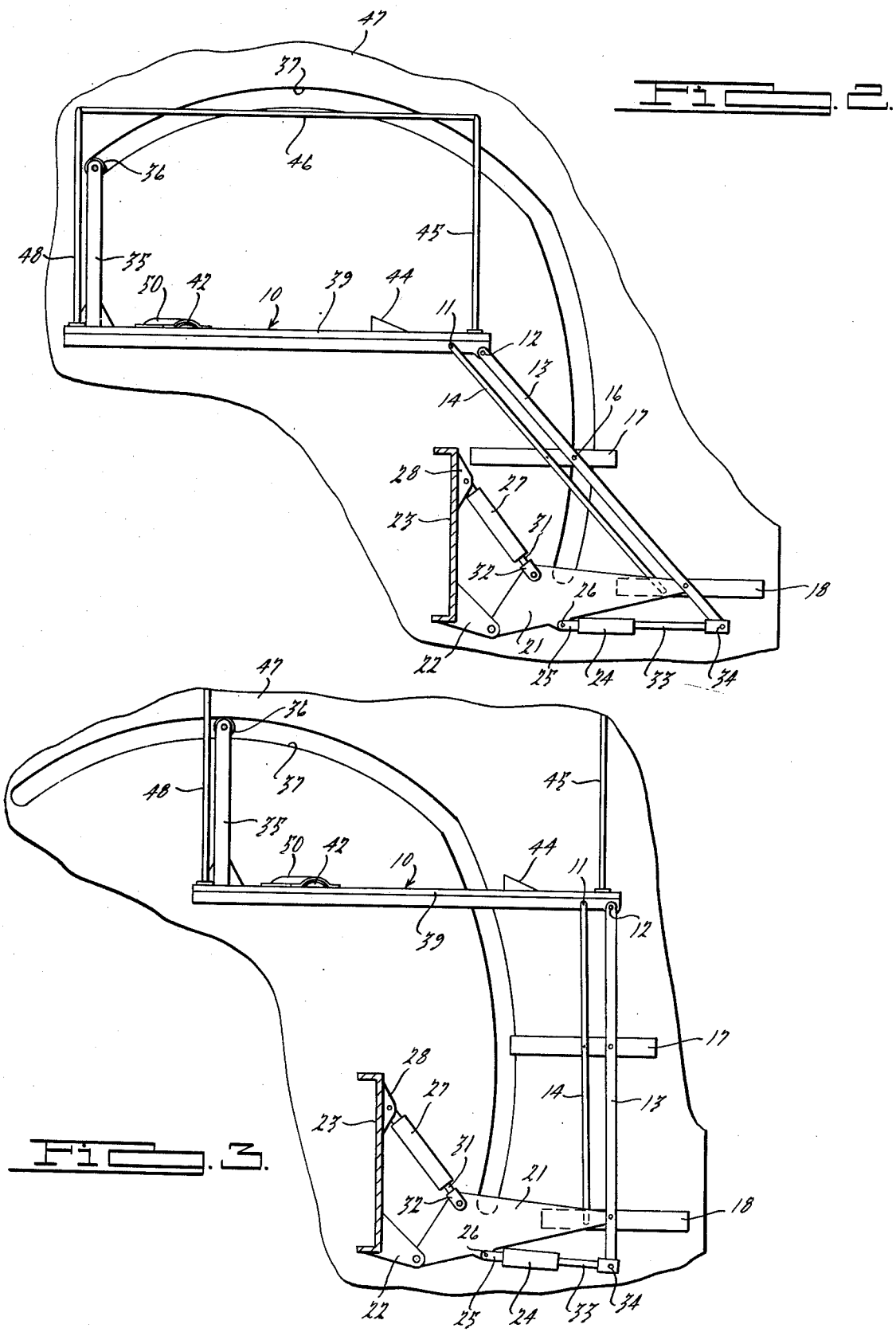

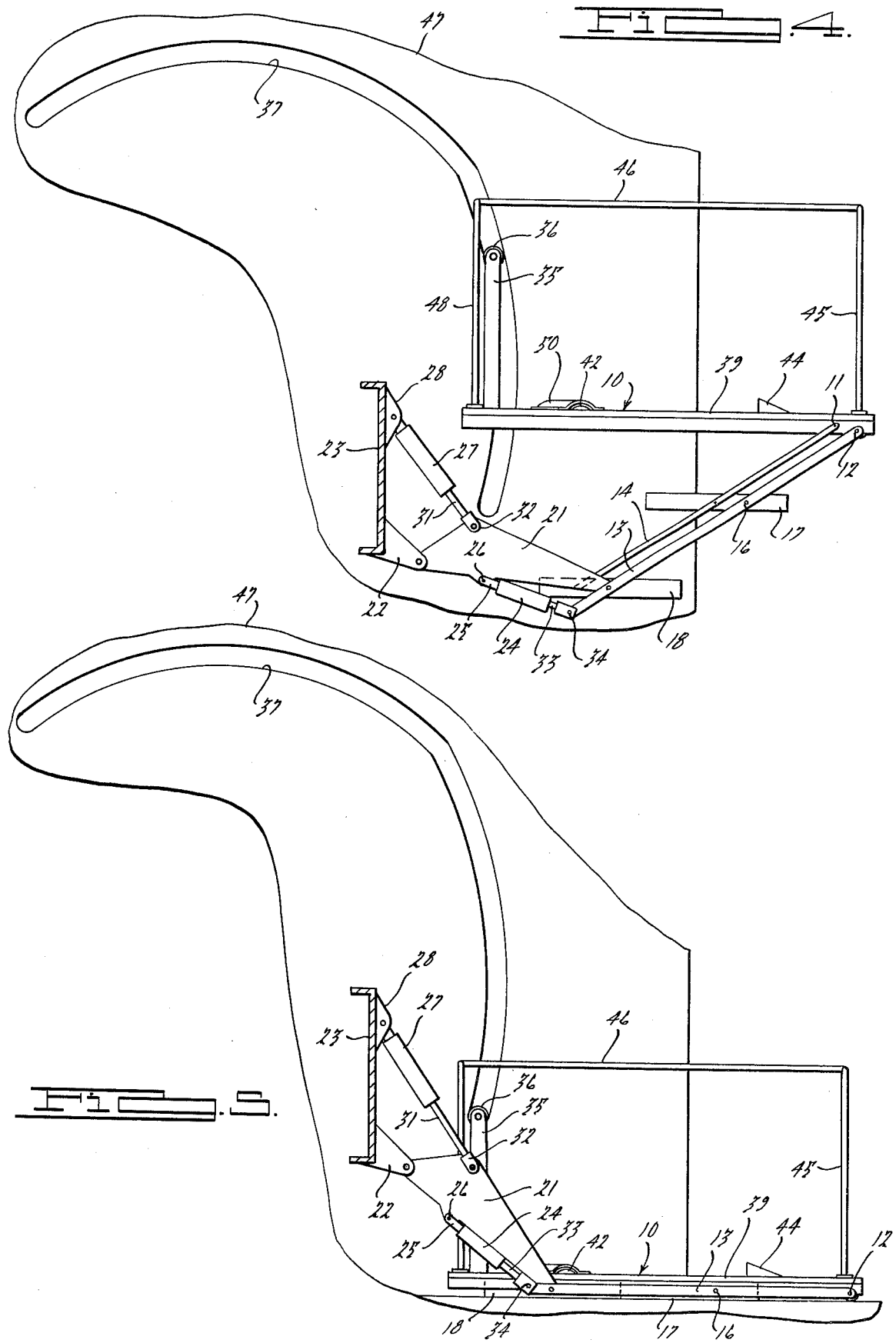

BUS LOADER

BACKGROUND OF THE INVENTION

Various types of platforms have been suggested heretofore in the art for use as a bus loader. One known in the art has a platform mounted on parallelogram arms on opposite sides which are tilted by a sprocket and chain drive for raising the platform from the ground and depositing it on the floor within the bus. This type of mechanism required substantial changes at the bus entrances. For one thing, the doors were remounted to swing outwardly rather than retained in their original swing-in position.

SUMMARY OF THE INVENTION

The invention pertains to a platform which is mounted on a vertical arm at the forward inward corner which guides the platform in its outward and downward movement. The movement is obtained by pivoting the ends of two parallel rods at each side at the front end of the platform between which a pair of rectangular plates are secured to function as steps when the platform is in raised position. A pair of links have the inner end mounted at the lower end of a chassis frame member with the front end pivoted on the pivot connecting the outermost rods to the bottom step. The rods extend downward below the step plate and have rams connected to the rear of the operating arm and the piston rods thereof connected to the ends of the downwardly extending rods. When the piston rod is drawn within the pair of cylinders of the rams, the platform is moved outwardly and the step plates are folded inwardly toward the underside of the platform. A second pair of rams is connected to the top of the frame member with the piston rods connected to the operating arms for moving the platform upwardly or downwardly as it is guided by an upwardly projecting arm at the inner forward corner thereof. A roller on the arm is guided horizontally in an arcuate slot which raises the platform approximately seven inches and in a vertical arcuate slot which thereafter advances the platform forwardly a small amount. When lowered, the step plates engage the underside of the platform and the first set of rams is released to permit the platform to seek the ground or the curbstone from which it will be raised when occupied.

A further novelty of the device is the employment of a plate on top of the platform with the forward inner corner mounted on a pivot beyond the guiding arm. The platform plate is movable substantially 45° by the operation of a ram on the forward side of the platform. Forwardly of the ram a sloping ramp block is provided over which the righthand wheel of the wheel chair will ride to lock to the chair against reverse movement. After the platform has been raised, it will pass across the horizontal arcuate portion and thereby be raised an additional seven inches. The outer edge of the platform is moved inwardly beyond the open door edges so that the platform ram may be energized to swing the platform onto the seat platform which is approximately 7 inches above the floor level and required to form wheel wells. The wheel chair is moved onto the seat platform by the occupant. One or two seats on the righthand side of the bus had been removed so as to provide sufficient area for the occupant to ride off of the platform plate onto the raised seat platform and swing himself around to face forwardly. Thereafter, the platform ram is reversed to have the plate swing back to its original position parallel to the platform and be advanced inwardly to rest upon the floor of the bus. The forward movement lowers the platform into position on the floor which is recessed to receive the platform or which has a sloping ramp at the inner edge to prevent a person from tripping. While the movement sounds complicated to a degree, it is not believed this to be the case since valves are operated automatically or by the bus driver to have the platform raised from lowered position, stopped at the high point on the horizontal arcuate slot and have the platform plate swung arcuately 45° to permit the occupant of the wheel chain to roll the chair off onto the platform. The platform plate is then returned to its position parallel to the platform and advanced completely within the bus. The platform is lowered to the ground only at stops to pick up some of the older or infirm people or a wheel chair so as to reduce the time required for loading. It is estimated that 20 seconds is all that would be required from the time the bus stops until it starts for moving the platform to the ground and raising it to stored position. This does not occur each stop but only where the occupant of the wheel chair or the handicapped and infirm desires to board or depart.

BRIEF DESCRIPTION OF THE DRAWINGS

FIG. 1 is a perspective view of a bus loader in stored position on the floor of the bus which is outlined in dot and dash lines;

FIG. 2 is a side view of the bus loader illustrated in FIG. 1;

FIG. 3 is a view of the structure illustrated in FIG. 2, with the platform moved one-half ways from its innermost horizontal position;

FIG. 4 is a view of the structure illustrated in FIG. 3, after the platform has been moved to its forwardmost position;

FIG. 5 is a view of the structure illustrated in FIG. 4, after the platform rests upon the ground;

DESCRIPTION OF THE PREFERRED EMBODIMENTS

Figure 6:
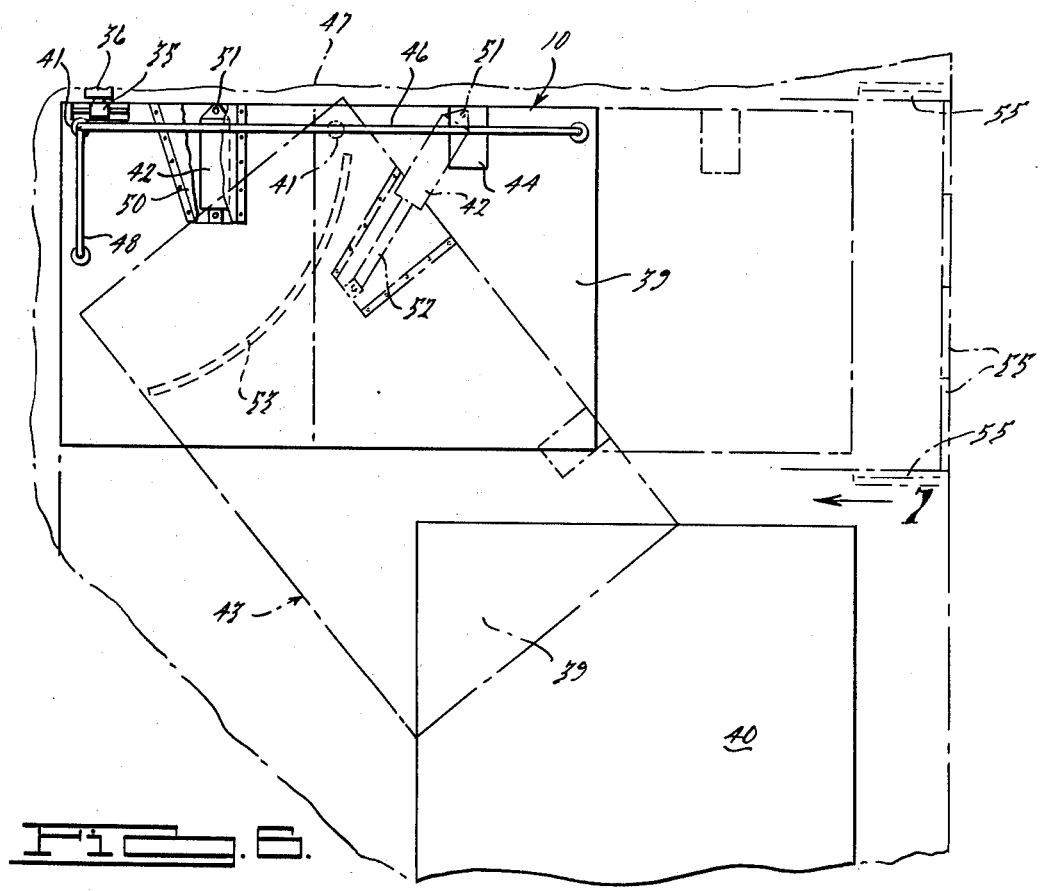
FIG. 6 is a plan view of the structure illustrated in FIG. 2 with a platform plate arcuately advanced approximately 45°.

Referring to the drawings, a platform 10 has pivots 11 and 12 at the outer ends of the sides. Two rods 13 and 14 are secured by the pivots with the lower end of the rod 13 extending downwardly at 15 below the rod 14. The rods 13 are secured by pivots 16 to an upper plate 17 which functions as a step within the bus entrance. A similar plate 18 functions as a lower step and is secured to the rod 13 by a pivot 19 on which a pair of operating arms 21 are secured. The arms 21 are mounted in brackets 22 at the lower edge of a bus frame member 23. A first pair of rams 24 have the rear cylinder end 25 secured to the operating arms 21 by pivots 26. A second pair of rams 27 have the rear cylinder end 28 secured in a bracket 29 at the top of the frame member 23 with the piston rods 31 secured to the bottom of the operating arms 21 by a pivot 32. A piston rod 33 in the cylinder portion of the rams 24 is connected by a pivot 34 to the lower end of the extensions 15 of the rods 13.

The platform has its inner end supported on an arm 35 containing a roller 36 at its top end which operates in a horizontal arcuate slot 37 and a vertical arcuate slot 38 at the front of the bus. The platform is extremely stable when supported on the two front corners and on the inner forward corner by rods 13 and 14 and arm 35 as above mentioned.

Figure 7:
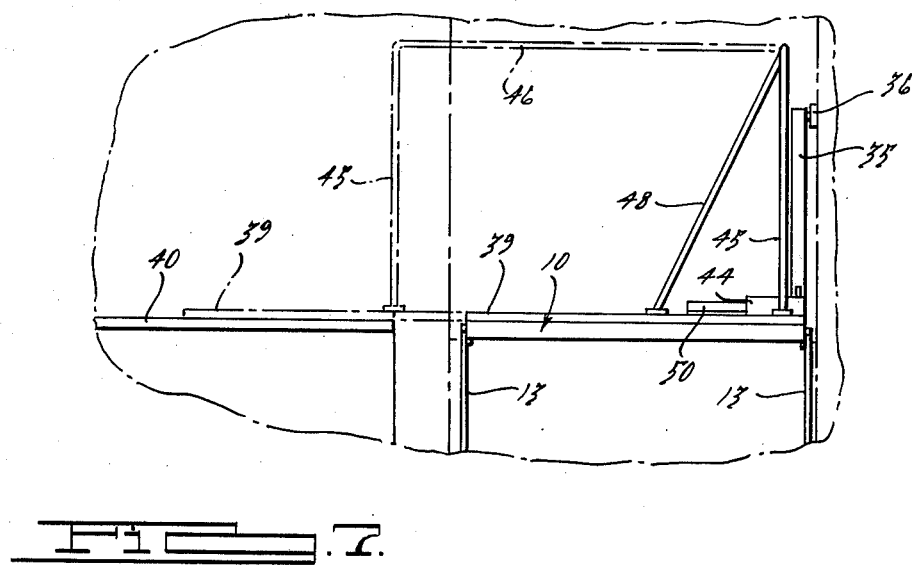
FIG. 7 is a view of the structure illustrated in FIG. 6, as viewed from the point 7 thereof.

As illustrated more specifically in FIGS. 6 and 7, the platform has a plate 39 mounted thereon on a pivot 41 in position to be actuated by a ram 42 on the platform to swing about the pivot 41 approximately 45°, as illustrated at 43. A small ramp 44 stabilizes the wheel chair when the right wheel rides thereover to be disposed between the ramp 44 and the ram 42 which is mounted on a pivot 51 at the rear end with the end of the piston rod 52 secured to the plate. The use of the plate has the advantage of swinging the wheel chair from a position facing the bus driver to one 45° therefrom after the platform has been raised to the center of the horizontal arcuate slot 37. This places the plate 39 slightly above the seat platform 40 which is approximately seven inches higher than the floor due to the wheel wells. One or two of the floor seats on the righthand side of the bus were removed to permit the wheel chair to be backed off of the plate 39 after it is swung over the seat platform. This permits the occupant to back therefrom onto the seat platform from which he can straighten up the chair to face forwardly. The retraction of the piston rod of the ram 42 returns the plate 39 to a position parallel to the platform 10 and the pair of rams 24 have the piston rods 33 further advanced to move the platform completely within the bus and dropped downwardly at the inner end of the arcuate slot 37 to rest upon the floor. The platform is retained in this position until it is needed again to lower the wheel chair or to lower or raise handicapped or infirm people. Otherwise, the people entering the bus will employ the steps 17 and 18 and use the plate 39 which is resting on the floor.

The sequence of operation of a plurality of valves to actuate the rams 24, 27 and 42 are under the control of the bus driver so that he can produce the necessary sequence to perform the required operations. In other words, if a stop is to be made and the wheel chair is to be lowered, then the platform will be moved by the rams 24 until the roller 36 reaches the high point of the arcuate slot 37 at which point a valve is actuated and the ram 42 will swing the plate 39 onto the chair platform 40 under the control of the bus driver. The occupant of the wheel chair can swing around and roll the wheel chair onto the plate 39 after which it will be swung into parallel relation with the platform 10 by the reverse movement of the piston rod within the ram 42. The outward movement of the platform is accomplished by the movement of the piston rods 33 into the cylinder of the rams 24 until the roller 36 reaches the high point of the arcuate slot 37. This motion may be continued if the wheel chair is not to be picked up or is continued thereafter by the further inward movement of the piston rods 33 to within the cylinder of the rams 24. This moves the platform from the inner position as shown in FIG. 2 to the high position as shown in FIG. 3 and to the forward position as illustrated in FIG. 4. The lowering of the platform is accomplished by the movement of the piston rod 31 outwardly from the cylinder of the rams 27 upon the bus driver operating another valve. This drops the operating arms 21 downwardly until the ground or curbstone is reached after which the piston rods 33 can be withdrawn further into the cylinder of the rams 24 to completely fold the step plates 17 and 18 under the platform 10 so that they can rest upon the ground or curbstone.

When the plate 39 and platform 10 is loaded either with a wheel chair or infirm people, the reverse movement of the rams 24 and 27 will raise the platform and dispose it within the bus. It will be noted that two upstanding rods 45 are provided at the forward outer and inner corners with the one of the inner corner braced by a sloping rod 48. The rods 45 are connected by a rod 46 which forms a handhold for the handicapped and the infirm as the platform is being moved upwardly, downwardly, inwardly or outwardly. The arcuate slot 37 is preferably cut within a thin plate 47 which is mounted at the front end of the bus to extend slightly into the windshield area. Since the plate is relatively thin, the slot may be thickened by slotted bars placed on either or both sides of the plate 47.

As is evident from an examination of the structure that very little work will be required on the bus to have the brackets 22 and 29 mounted on the frame member 23 thereof and the attachment of the slotted plate 47 at the front of the bus. This only requires for removal of the central and bottom step which provides an entrance way for the platform. Only one-half of the platform needs to extend outwardly from the bus side when lowered as illustrated in FIG. 5. Bearing means 53 may be provided between the plate 39 and platform 10, as illustrated in FIG. 6, which may be dissimilar materials or which may be balls and a race to permit the easy movement of the plate 39 on the platform. A cover 50 may be placed over the ram 42 to block the forward movement of the wheel chair. Similarly, the roller 36 may be mounted on bearings so as to rotate smoothly in the slots 37 and 38. It is to be understood that the arrangement presently described mounts the platform on the bus floor inwardly of the front entrance from which it is moved outwardly and lowered to the edge of the road or curbstone. If a plurality of the wheel chairs are to be carried by the bus, then more of the bus seats will be removed so as to provide areas along the seat platform 40 for the plurality of wheel chairs. In this arrangement, the wheel chairs are locked in position preferably by means which extend outwardly into engagement with the person sitting therein. The entrance doors 55 are folded against each other and the entrance walls and do not interfere with the movement of the platform 10 or the swinging of the plate 39 onto the platform 40 for the seats. Preferably the doors 55 are closed for the added safety which is provided by the closing of the entrance when the platform is moved upwardly and downwardly therewithin.

We claim:

1. In a bus loader, a platform, a movable support for said platform located in the entrance way at the front of the bus after the steps were removed therefrom, means actuating said movable support to raise the platform from the ground and advance it forwardly onto the floor of the bus, upper and lower step plate means at the underside of the platform and connected thereto and movable to step loading position as the platform is moved from the ground to the position within the bus, said bus having a frame member at the side, brackets secured to the bottom of said frame member, operating arms pivoted on said brackets, pivot means securing the opposite ends of the operating arms to the lower step plate means, a pair of rams pivoted to brackets at the upper part of said frame member and the operating arms for raising said platform from the ground upwardly adjacent to the plane of the bus floor.

2. In a bus loader as recited in claim 1, wherein a pair of rods are pivoted to the sides of the platform at the outer end thereof, said outer rods being secured on the pivot of said operating arms and to said lower step plate and extending therebelow, pivot means securing the rods to said upper step plate, pivot means securing the inner rods to the lower step plate, and a second pair of rams connected to the operating arms and to the downwardly extending ends of said outer rods, the shortening of the second pair of rams moving said platform outwardly from the floor of the bus.

3. In a bus loader as recited in claim 2, wherein a supporting arm extends upwardly from the inner forward corner of the platform, a roller on the upper end of the arm, and arcuate horizontal and vertical communicating slots in a supporting plate located at the forward wall of the bus for receiving said roller and supporting and guiding the inner end of the platform as it is moved outwardly and then downwardly with the roller following the movement in said slots.

4. In a bus loader as recited in claim 3, wherein a plate is mounted on the platform on a pivot at the corner adjacent to said supporting arm, and a ram on said platform for shifting the plate about said pivot when the roller is in the high point of the horizontal arcuate slot which delivers the plate onto the seat platform which is located above the floor to provide a wheel housing.

5. In a bus loader as recited in claim 4, wherein the outer end of the platform plate has a small ramp provided thereon over which the right wheel of the wheel chair is rolled which retains the wheel chair on the plate and over which the wheel is rolled by the occupant when moving from the pivoted plate to the seat platform in an area where one or more seats have been removed permitting the occupant to swing the chair to face forwardly of the bus.

6. In a bus loader as recited in claim 5, wherein the plate pivoted to the platform is returned to its position parallel thereto by the reverse action of the platform ram.

7. In a bus loader as recited in claim 6, wherein hydraulic valves are positioned adjacent to the bus driver which permits him to manually operate the platform when required to first operate the first pair of rams to move the platform outwardly from the floor into the bus entrance and thereafter operate the second pair of rams for lowering the platform to the ground while the inner end is guided by the roller in said slots, the bus operator reverses the valve actuation for raising the platform and moving it along the horizontal arcuate slot which raises the platform to the height of the seat platform whereupon the movement is stopped and the platform ram for operating the plate angularly on the platform is energized to shift the plate from the platform onto the seat platform and after the occupant of the wheel chair has backed therefrom to return the plate to its parallel position with the platform and the platform advancement completed onto the bus floor all under the manual control of the bus operator.

8. In a bus loader as recited in claim 2, wherein said pairs of rods shift the step plates to a position one forward of the other before the platform reaches the ground so as to be parallel to the platform without interferring with its operation, the raising of the platform producing the reverse movement of the step plates into step position when the platform is in raised position.

9. In a bus loader as recited in claim 6, wherein the plate having the horizontal and vertical arcuate slots therein is vertically mounted at the front end of the bus directly adjacent to the forward side of the platform for receiving said roller which is attached to the supporting arm.

10. In a bus loader as recited in claim 9, wherein reinforcing strips are provided about said slots on said thin plate to provide width thereto for the roller which extends thereinto and operates therein.

* * * * *